Figure 1:
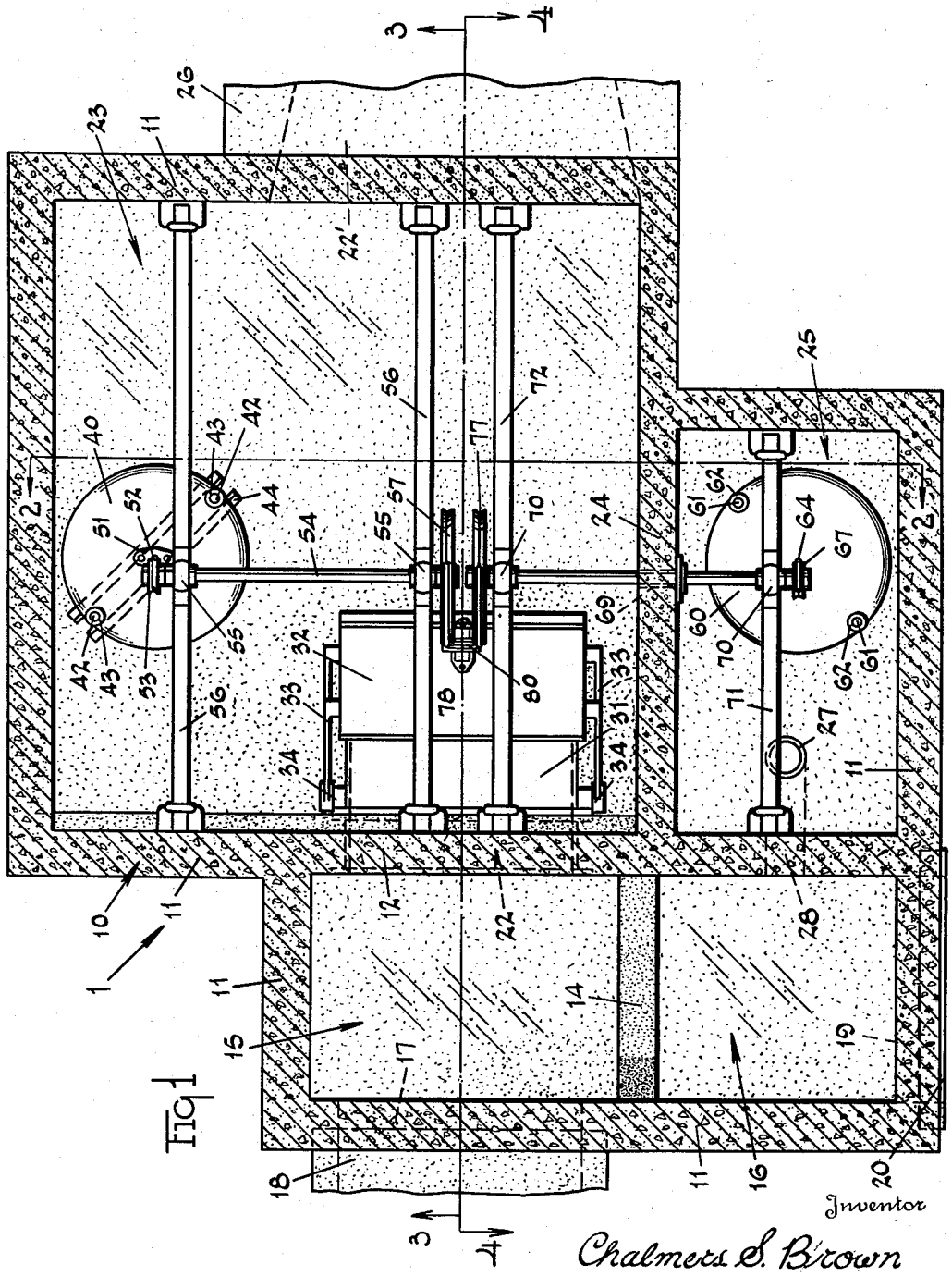

April 21, 1959  C. S. BROWN  2,882,919
SEWER REGULATOR

Filed May 3, 1956  4 Sheets-Sheet 1

Inventor
Chalmers S. Brown
By Tillman Crampton
Attorney

April 21, 1959

C. S. BROWN 2,882,919

SEWER REGULATOR

Filed May 3, 1956

4 Sheets-Sheet 2

Inventor
Chalmers S. Brown
By
Attorney

April 21, 1959 — C. S. BROWN — 2,882,919
SEWER REGULATOR
Filed May 3, 1956 — 4 Sheets-Sheet 3

Inventor
Chalmers S. Brown
By [signature]
Attorney

United States Patent Office 2,882,919
Patented Apr. 21, 1959

2,882,919

SEWER REGULATOR

Chalmers S. Brown, Lima, Ohio, assignor to Brown & Brown, Incorporated, Lima, Ohio, a corporation of Ohio Application May 3, 1956, Serial No. 582,396

6 Claims. (Cl. 137—115)

My invention concerns sewerage and more particularly the regulation of sewage flow through a sewer system.

The regulation of sewage flow is needed most often in sewer systems which have interconnected combined and interceptor sewers. In such systems, the sanitary and industrial flows form the normal dry-weather flow through the combined sewer of the system. When the interceptor sewer of the system leads to a sewage treatment plant, it is customary for the dry-weather flow from the combined sewer to be diverted into and through the interceptor sewer.

However, sewage treatment plants are limited in their water handling capacity. These limitations range upward from the capacity to handle dry-weather flow to a capacity to handle two or three times the dry-weather flow of the area. This is usually sufficient to deal with crests produced by use of the system and by normal rainfall but is insufficient to deal with flood conditions, which may produce flows equivalent to six or more times dry-weather flow. It is the practice, in systems having connected combined and interceptor sewers, therefore, to provide means to reduce or to limit flow from the combined sewer to the interceptor sewer which means preferably become automatically effective at flood times to limit or stop the flow from the combined sewer to the interceptor sewer and, upon the return to normal dry-weather times, just as automatically, reestablish the flow from the combined sewer to the interceptor sewer. My invention is concerned with the provision of such a means.

My invention is also concerned that such means, during dry-weather flow, should momentarily check such dry-weather flow and, therefore, operate to even-out surges or minor crests as may occur in the dry-weather flow entering the interceptor sewer. By this provision, the flow through the interceptor sewer and to the treatment plant to which the interceptor may lead is made more uniform and, hence, more easily handled.

An important object of my invention is to provide a regulator in sewer system, which includes connected combined and interceptor sewers, such regulator having a movable valve for controlling flow from the combined to the interceptor sewer and being operable by float means on and responsive to sewer water on the interceptor sewer side of the valve, such float means being rendered inoperative to operate the valve, particularly to open it, by another float means on and responsive to sewer water on the combined sewer side of the valve. The first named float means, in operating the valve to open and close, as the sewer water on the interceptor side of the valve falls and rises, tends to even-out minor crests or surges of the dry-weather flow in the combined sewer and, hence, produces the desired more uniform flow into and through the interceptor about which I have written. However, were the valve to continue to open even spasmodically during flood periods, the flow into the interceptor would be excessive during the open phase by reason of the flood head and the dilution of the sewage by reason of added flood waters would make handling at the treatment plant inefficient and difficult. Therefore, the provision of the additional float means, which is on and is responsive to sewer water on the combined sewer side of the valve where flood makes an early effect and which is operative to render the first named float means inoperative to open the valve, safeguards the interceptor and the treatment plant from receiving sewer water during flood periods and until normal dry-weather conditions are reestablished in the sewer system.

Another and more particular object of my invention is to provide a sewer regulator in which there are four chambers, they being an inlet chamber, an outlet chamber, an interceptor chamber and a float chamber with the interceptor chamber having an inlet from the inlet chamber and an outlet and the float chamber being connected to the outlet chamber by a telltale and there being a movable valve for controlling flow through said interceptor chamber inlet, the movements of which valve relative to a closed position are controlled by a float in the interceptor chamber and by another float in the float chamber and operating to render the first named float ineffective when the sewer water rises in the float chamber. Thus, I provide what may be popularly called a "dual control regulator" not only usable to great advantage in sewerage systems but in other fluid flow systems.

More particularly my invention has for an object to provide in a means for raising a gate valve whose closure is responsive to gravity, the combination of a block pulley connected to said gate valve and with a taut tackle cable looped under the block pulley and having each of its ends around and connected to a windlass, each of which windlasses is caused to rotate to thereby reel the cable in or out by a float, as the float falls or rises, the float operating one windlass being on one side of the valve and the float operating the other windlass being on the other side of the valve. When one float is up, the fall of the other float merely causes the windlass operated by it to reel in cable equal to that reeled out when the first float rose. Hence, the raising of the valve is dependent not only on the fall of one float but also on whether the other float has also fallen or is already down. By this arrangement, the opening of the valve is put under the automatic control of conditions on opposite sides of the valve which at various times differ from desired conditions.

My invention has for further objects those of providing other advantageous structures and arrangements which will appear from the following description and from an examination of the accompanying drawings. Sewer regulators containing my invention may take various forms one of which appears to me, at this time, to be the best mode of carrying out my invention. I shall describe such form and in doing so will make reference to the accompanying drawings. However, I do not imply by such description or reference that variation from such described form is beyond the contemplation of any invention made manifest herein.

Figure 2:
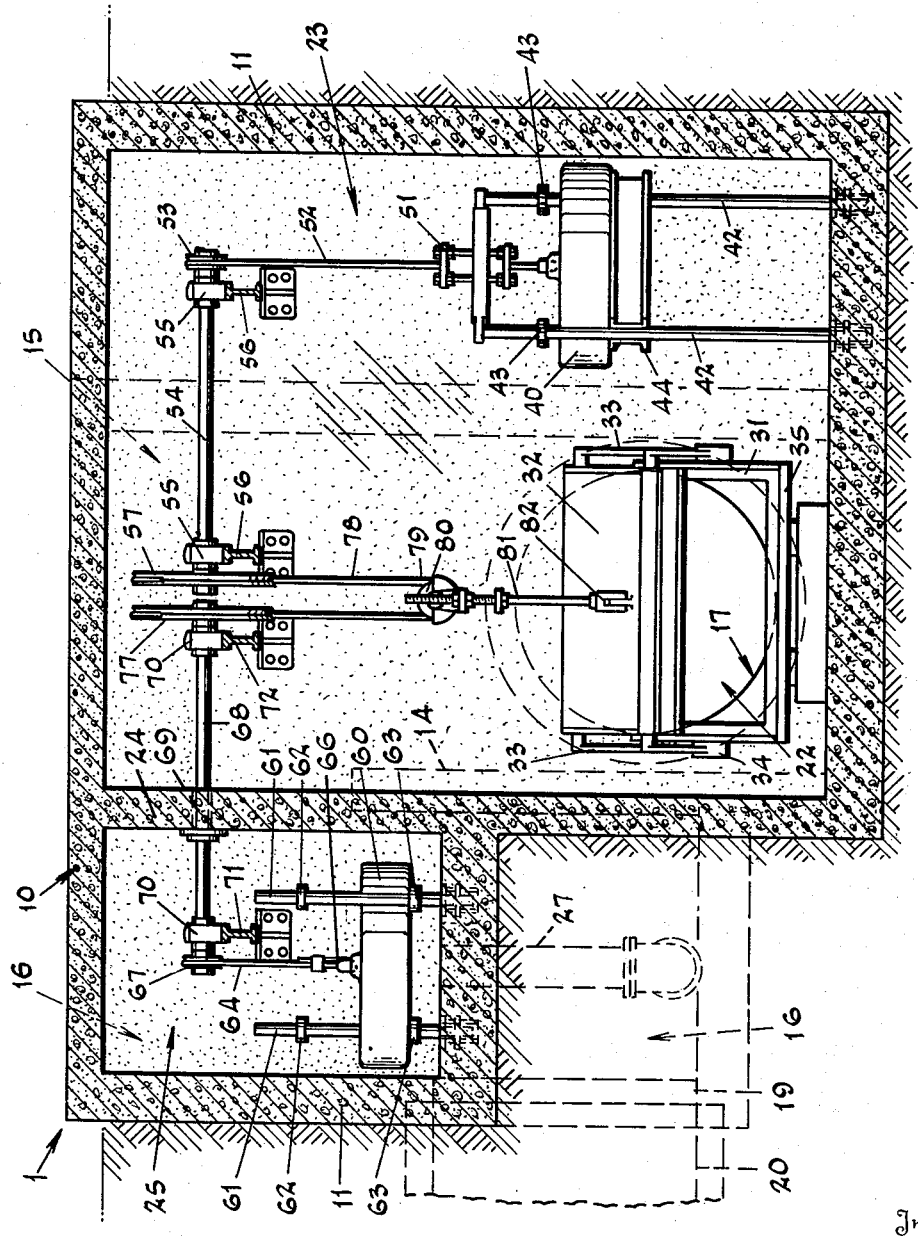
Figure 3:
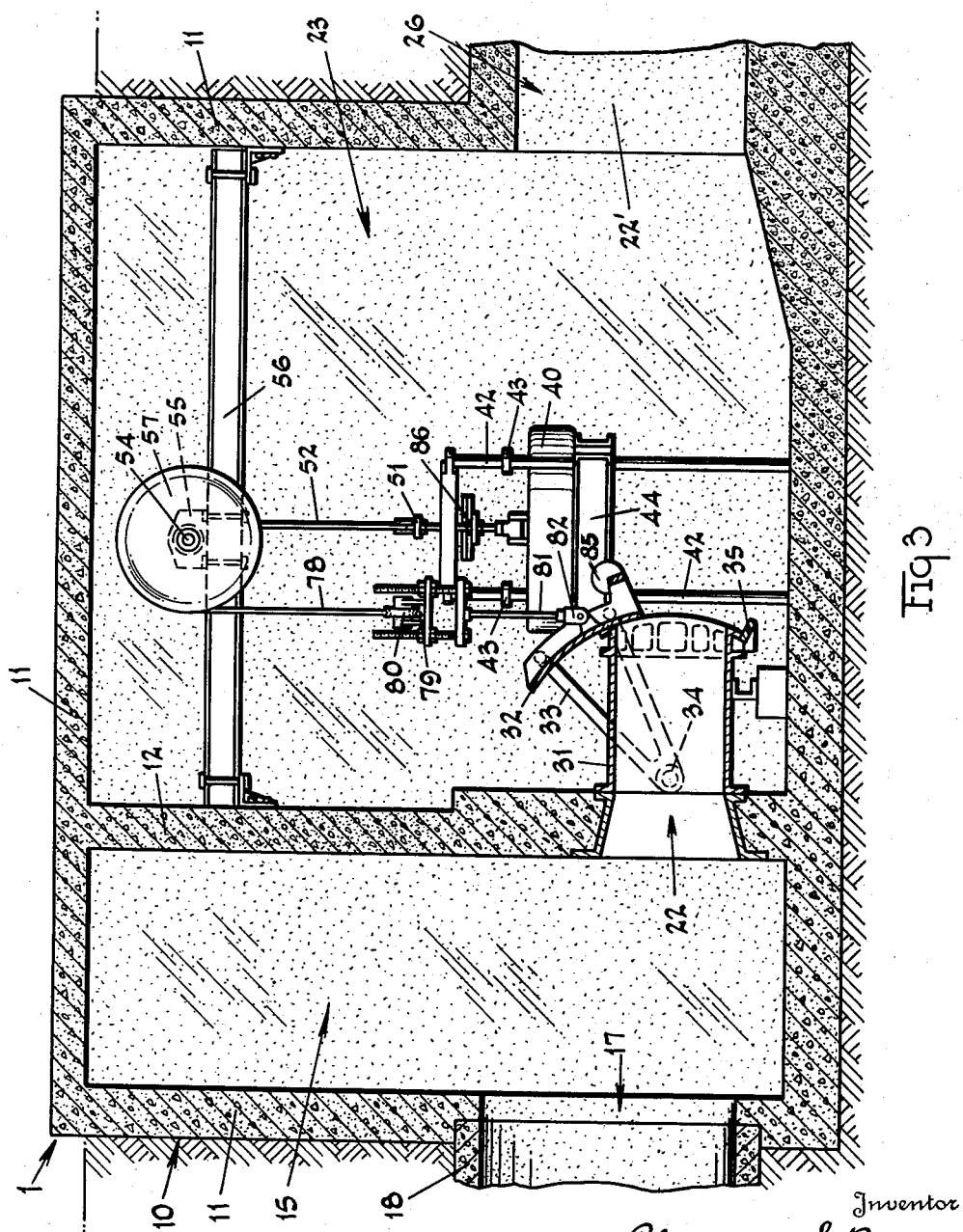
Figure 4:
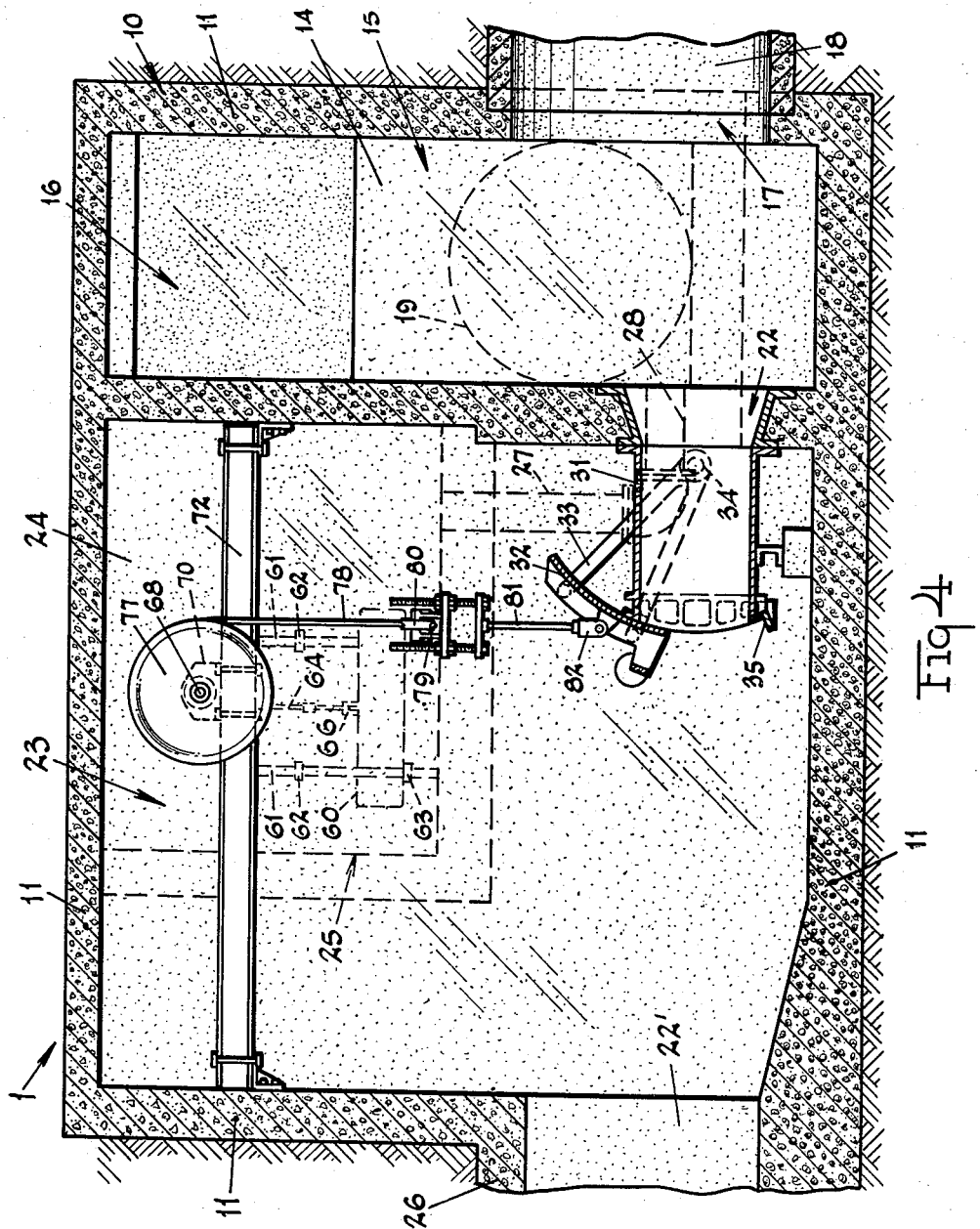

Figure 1 of the accompanying drawings is a plan view illustrating a sewer regulator embodying my invention and shown in a sewer system. Figure 2 illustrates a view of a section of the sewer regulator shown in Figure 1 taken along the plane of the line 2—2 indicated therein. Figure 3 shows a view of a section of said regulator taken along the plane of the line 3—3 indicated in Figure 1. Figure 4 illustrates another section taken along the line 4—4 indicated in Figure 1, certain walls of the regulator being shown broken away to facilitate the showing.

The sewer regulator 1, shown in the accompanying drawings, selected to illustrate an embodiment of my invention, broadly considered, has a housing and flow control mechanism. The housing may be suitably connected in a sewer system which it controls and support the flow control mechanism housed within.

*The housing*

The housing, indicated generally at 10, preferably has exterior concrete slab walls 11 and its interior divided by partitions into various chambers. A wall 12 and overflow partition or weir 14 form an inlet chamber 15 and an outlet chamber 16. The inlet chamber 15 has an opening 17 through which an upstream end 18 of a combined sewer of a sewer system may communicate with the regulator 1. The outlet chamber 16 has an opening 19 through which the river or outfall end 20 of the combined sewer of such system communicates with the regulator. Flow between chambers 15 and 16, that is, flow from the upstream sewer end 18 to the outfall sewer end 19, occurs only if and when the sewer water in the system rises above the crest of the weir 14. At all other times, inflow from upstream sewer end 18 passes through an opening 22 in the inlet chamber 15 into an interceptor chamber 23.

The interceptor chamber 23 is formed in part by wall 12 and by a cross-wall 24. The cross-wall 24 divides the remainder of the space within the regulator housing 10, after provision for the inlet and outlet chambers, into the just mentioned interceptor chamber 23 and a float chamber 25. The interceptor chamber 23 not only has the inlet opening 22 from the inlet chamber 15 but also has an outlet opening 22' through which an end 26 of an interceptor sewer receives sewage from the interceptor chamber 23.

The float chamber 25 communicates with the outlet chamber 16 through a weep-pipe or telltale 27. The lower end of 28 of telltale 27 communicates with the outlet chamber 16 at a point well below the crest of the weir 14. Thus, when flood prevails at the outfall of the system and the sewer water rises as consequence thereof, the sewer water will first enter the regulator outlet chamber 16 through the opening 19. The weir 14 will prevent further back flow up the combined sewer. Instead the flood water will begin to head in the outlet chamber 16. If the sewer water continues to rise, it will eventually enter the float chamber 25 through the telltale 27. The escape of sewer water from the float chamber 25 is back down through the telltale 27 to outlet chamber 16. This occurs, however, only when the sewer water falls in said regulator outlet chamber 16. Preferably, the water enters the float chamber 25 before the water is high enough to overflow the weir 14.

*The flow control mechanism*

In order to control the flow through the interceptor inlet opening 22, I provide a flow control mechanism. The flow control mechanism I have selected may be conventional having a flume 31 mounted on the wall 12 in registry with opening 22 and a valve member 32 mounted as by arms 33 pivotally engaging, as at 34, the sides of the flume 31. The valve member 32 is thus supported for up and down movement to open and close the end of the flume 31. A stop, such as the lip or ledge 35, on the lower edge of the flume 31 limits the downward movement of the valve member 32 to one which closes the flume 31 and thus the opening 22. Since the weight of the valve member 32 serves to move it to closed position, it is necessary to raise the valve member 32 to open the flume. To do this I provide a float means.

Such a float means includes a float 40 in the interceptor chamber 23. The float 40 and its mounting may be conventional. The float 40 rises and falls with the rise and fall of sewer water in the interceptor chamber. The rising and falling movement of the float 40 is guided suitably by vertically extending guides 42. The extent of the float movement is limited upwardly by collars 43 on the guides 42 and downwardly by a channel support 44 extending across such guides. The upper and lower limits may be adjusted to fit the needs and conditions of a situation in the field to activate the float to rise and fall at proper levels and over desired distances. The consequence of such rising and falling of the float 40 is transmitted to the gate valve 32 through a transmission.

The transmission selected includes a turnbuckle hitch 51 suitably connected to the float 40 and a chain or cable 52, one end of which is connected to the hitch 51 and the other end of which is looped around and connected to a pulley windlass 53. The windlass 53 is keyed to one end of a shaft 54. The shaft is rotatably mounted in spaced journal bearings 55 on parallel trusses 56 extending across the interceptor chamber 23. The other end of shaft 54 supports a second pulley windlass 57, which is keyed to and rotatable with said shaft. This arrangement is such that as the float 40 falls, due to water leaving the interceptor chamber 23, the float will draw the cable 52 off the windlass 53, causing the windlass and the shaft 54 to rotate. Rotation of shaft 54 rotates the windlass 57.

The flow control mechanism of my invention also includes a second float means actuated by sewer water on the combined sewer side of valve member 32, particularly, sewer water entering the outlet chamber 16 and ultimately the float chamber 25 from the river outfall end 20 of the combined sewer. Most often entry of sewer water into the outlet chamber and float chamber occurs during the existence of flood conditions. The second float means has a float 60 as its primary actuator.

The float 60 is disposed in the float chamber 25 and is adapted to rise and fall with rise and fall of sewer water in said chamber. The float 60 may be guided in such movement by suitable vertically extending float guides 61. The guides 61 mount adjustable stop collars 62 and 63 for limiting the upward and downward movement of the float. The float 60 transmits the effect of its movements through a transmission which, in the form illustrated in the accompanying drawings, includes a chain or cable 64 connected at one end, as by a turnbuckle hitch 66, to the float 60. The other end of the cable 64 is wound about and attached to a pulley windlass 67 mounted on and keyed to a shaft 68. The shaft 68 extends into the interceptor chamber 23 through an opening 69 in the cross-wall 24, and is supported for rotation by suitably spaced journal bearings 70 on trusses 71 and 72. The truss 71 extends across the float chamber 25 and truss 72 across the interceptor chamber 23. The bearings 70 support the shaft 68 in axial alignment with the shaft 54 of the float 40 transmission. That end of the shaft 68 within the interceptor chamber 23 supports a pulley windlass 77. The windlass 77 is keyed to the shaft 68 and thus, when the float 60 falls, as the sewer water leaves the float chamber 25, the cable 64 will be drawn off of the windlass 67 causing the windlass 67 and the shaft 68 and windlass 77 to rotate.

In order to connect the valve member 32 to the transmissions of float 40 and 60, I provide a chain or cable 78, one end of which is wound around and connected to the windlass 57 and the other end is wound around and connected to the windlass 77. The cable 78 in its flight 79 between the windlasses 57 and 77 is in a taut loop around a block pulley 80 mounted on one end of a hitch 81 pivotally fixed in trunnion bearings 82 on the valve member 32. Thus, when the windlass 57 is rotated in a direction to reel the cable 78 in, the flight 79 of cable 78 will have its effective length diminished and the block pulley 80 and valve member 32 will be raised to open the flume 31. Should, however, the windlass 77 be, at the same time or previously have been rotated in a direction to reel the cable 78 out, increasing the effective length of the flight 79, the reeling in of the cable by the windlass 57 will have no effect on the valve member 32. The entire movement of the windlass 57, in that instance, would be compensatory and expended in taking up the slack in the flight 79 of the cable added to it by the unreeling of the cable from windlass 77.

Thus, the rise of the float 60 due to flood conditions renders the movement of float 40 inoperative to effect opening of the valve member 32. However, when the flood conditions pass and the float 60 as a consequence falls, the control of the valve member 32 comes again under the direction of float 40 until the rise of flood conditions.

In order to "balance" the transmissions, if they are out of balance, and so that the weight of the float 40 exerted through its described transmission will lift the valve member 32, as the float falls with the fall of sewer water in the interceptor chamber 23, I provide and may apply suitable shutter-weights 85 on the valve member 32 and counter-weights 86 on the float 40. The choice of these shutter-weights 85 and counter-weights 86 and their application is such that the free weight of the float 40 is sufficient to lift the valve member 32 to full open position. Counter-weights 86 may also be applied to float 60 as to counter-balance the combined weights of float 40 and of the valve member 32. Thus, the distribution of weight should be such that the float 60 remains in its lowermost position, until floated up by the rising water in the chamber 25, notwithstanding the interaction of opening and closing between the valve member 32 and float 40.

Consequently, it will be seen that a sewer regulator embodying my invention provides "automatic" regulation, particularly advantageous in systems having joined combined and interceptor sewers.

I claim:

1. In combination with a sewer system, a flow control mechanism therefor comprising a movable gate valve; bearing means in the sewer system and in engagement with said gate valve for supporting the gate valve in the sewer system for movement to and from valve open and valve closed positions; movable means in the sewer system and hydraulically on one side of the gate valve and responsive, by rising and falling, to the rise and fall of sewer water on said side of the gate valve; transmission means in engagement with the gate valve and the movable means and operative when the movable means moves in one direction to transmit the motion of the movable means to the gate valve and thereby to move the gate valve; and a second movable means independently movable of the first named movable means and in engagement with the transmission means and being in the sewer system and hydraulically on the other side of the gate valve from that of the first named movable means and being responsive, by rising and falling, to the rise and fall of sewer water on said other side of the gate valve and operative when moving in one direction to render the transmission means inoperative to transmit the motion of the first named movable means to the gate valve.

2. In combination with a sewer system, a flow control mechanism therefor as described in claim 1 having in addition biasing means in engagement with the gate valve and operative to yieldably retain the gate valve in one of its said positions and adapted to being overcome by movement of the first named movable means except when said transmission means is rendered inoperative.

3. In combination with a sewer system, a flow control mechanism therefor comprising a valve; means in the sewer system and in engagement with the valve for supporting the valve in the sewer system for movement relative to valve open and valve closed positions; movable means in the sewer system and hydraulically on one side of the valve and responsive, by rising and falling, to the rise and fall of sewer water on said side of the valve; means in engagement with and operatively connecting said valve to the movable means and including an element of adjustably effective length and operable when said element is of one length of a range of effective lengths to transmit the movement of the movable means to the valve and when said element is one length of another range of effective lengths to allow the movement of said movable means to be dissipated without motion of the valve; and a second movable means in the sewer system and hydraulically on the other side of the valve from that of the first named movable means and in engagement with and operatively connected to the element of the first named movable means; said second movable means being responsive, by rising and falling, to the rise and fall of sewer water on said other side of the valve and operative, on rising and falling, to vary the effective length of said element between that of a length within the range of motion transmittal lengths as aforesaid and that of a length within the range of motion dissipation lengths as aforesaid whereby the operability of the first named movable means to move the valve from one of its said positions depends on the position of the second named movable means.

4. In a sewer regulator having a inlet chamber, an outlet chamber, an interceptor chamber and a float chamber; the interceptor chamber having an inlet from said inlet chamber and an outlet; a movable valve movably supported in the interceptor chamber for controlling flow through said interceptor chamber inlet; float means in the interceptor chamber actuatable by the rise and fall of sewer water in said interceptor chamber; a telltale connecting the outlet chamber with the float chamber whereby sewer water in said outlet chamber may flow into said float chamber and rise and fall as the sewer water in said outlet chamber rises and falls; a second float means, said second float means being in said float chamber and actuatable by the rise and fall of sewer water in said float chamber; and a transmission means operatively connecting both said float means to said movable valve for opening and closing the valve and including a pair of pulley windlasses, one of said windlasses being operatively connected to said first named float means and the other of said windlasses being operatively connected to the second float means; a line having one end around and connected to one windlass and the other end around and connected to the other windlass; a pulley on the line between said windlasses operatively connected to the movable valve; said windlasses being caused to rotate in directions to reel out said line when the float means operatively connected thereto moves in one direction and to rotate in a direction to reel in the line when the float means operatively connected thereto moves in the opposite direction.

5. In a means for raising a gravity closed gate valve, the combination of a pulley connected to the gate valve; a pair of rotatable windlasses above the pulley; a line in a taut loop around and under said pulley with one end of the line being around and connected to one windlass and the other end of the line being around and connected to the other windlass; a pair of floats; one float being on one side of the gate valve and being operatively connected to one windlass whereby the fall of said float causes the windlass to which it is operatively connected to rotate to thereby reel the line in and to raise the gate valve; and the other float being on the opposite side of the gate valve and being operatively connected to the other windlass whereby the rise of the last named float causes the windlass to which it is operatively connected to rotate to thereby reel the line out and thus to slacken the line so that the fall of the first named float and the consequent reeling in of the line by its aforesaid associated windlass is expended in taking up the line slack and the gate valve remains stationary until the fall of the second named float.

6. In a sewer regulator for a sewer system including a combined sewer and an interceptor sewer, the regulator having inlet, outlet, interceptor and float chambers; the inlet and outlet chambers being connected to opposite ends of the combined sewer; a weir being between the inlet and outlet chambers; the interceptor chamber having an inlet from the inlet chamber and an outlet connected with the interceptor sewer; a gate valve; means engaging said gate valve for pivotally supporting said gate valve for rising and falling movement across the interceptor chamber inlet thereby controlling the flow of sewage from the inlet chamber into the interceptor chamber; a pair of floats; one float being in the interceptor chamber and the other float being in the float chamber; a pair of windlasses; means individual to each windlass and each float operatively connecting a float to a windlass so that as the float rises and falls the windlass rotates in a direction according to the rise and fall of said float; a cable having one end around and connected to one windlass and the other end around and connected to the other windlass with a taut looping flight between said windlasses; a pulley operatively connected to the gate valve and in rolling engagement with said looping flight of said cable whereby the movement of the float in the interceptor chamber causes the windlass operatively connected to it to rotate and reel the cable to vary the effective length of the looping flight to move the gate valve; and a telltale connecting the outlet chamber and the float chamber whereby sewer water entering said outlet chamber enters the float chamber to actuate the float therein and cause the windlass operatively connected to it to rotate and reel the cable to vary the effective length of the looping flight in counter-action and nullification to the reeling of the cable by the windlass operated by the float in the interceptor chamber.

References Cited in the file of this patent

UNITED STATES PATENTS

| 1,532,829 | McMillan | Apr. 7, 1925 |
| 2,150,359 | Brown | Mar. 14, 1939 |

FOREIGN PATENTS

| 535,721 | Germany | Oct. 13, 1951 |